Patented Nov. 20, 1923.

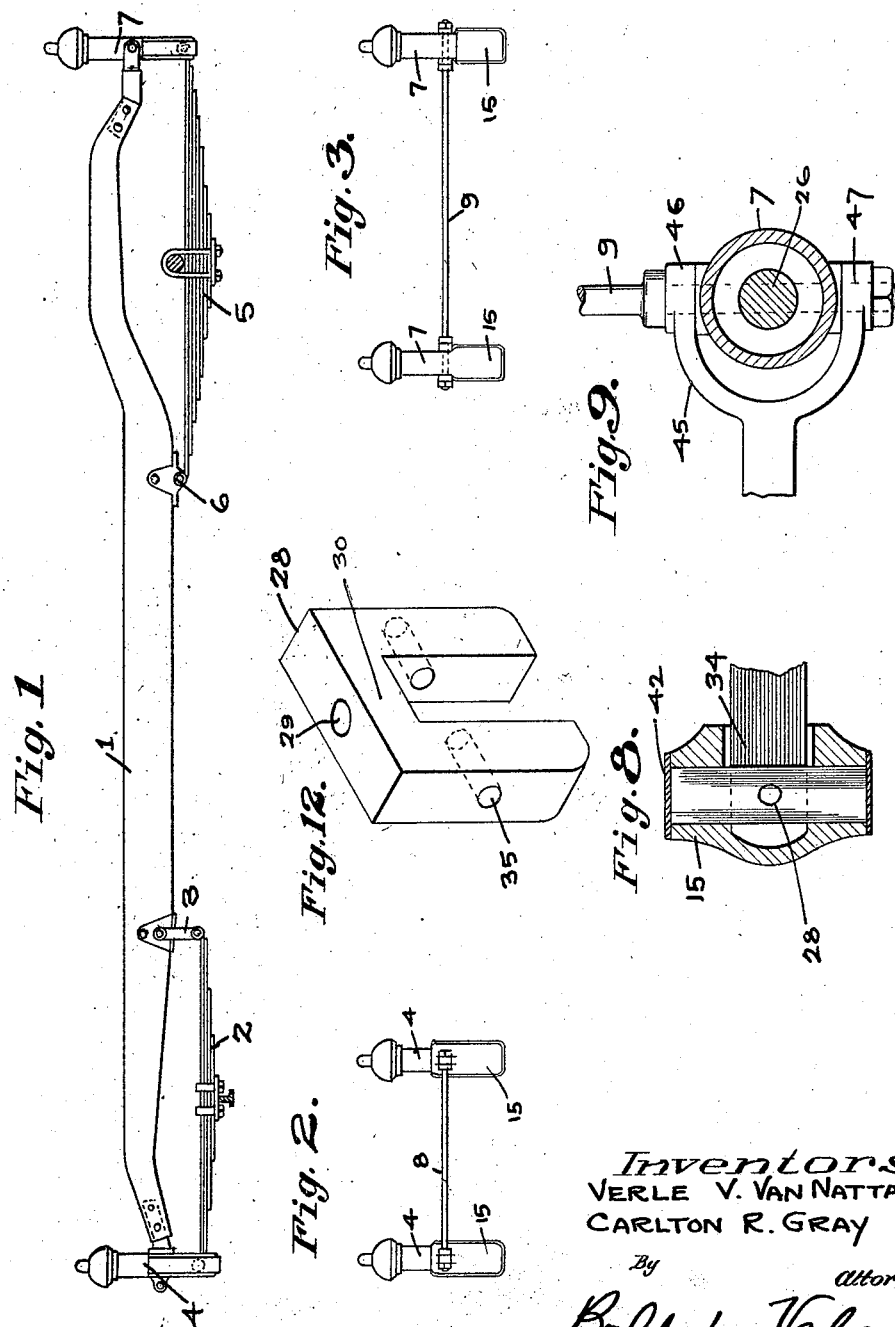

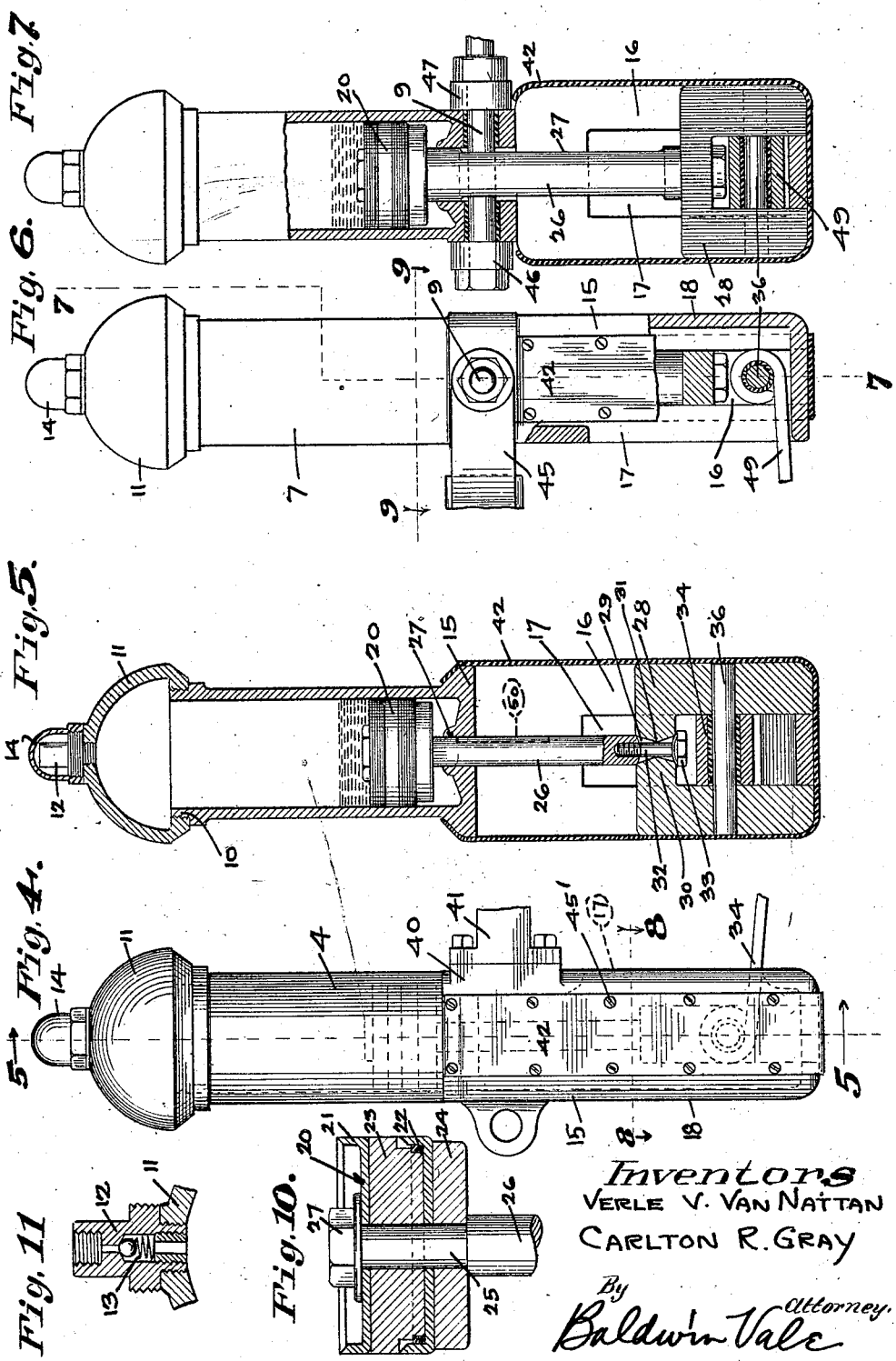

1,474,656

UNITED STATES PATENT OFFICE.

VERLE V. VAN NATTAN AND CARLTON R. GRAY, OF SAN FRANCISCO, CALIFORNIA, ASSIGNORS TO VAN N AIR SPRING COMPANY, OF SAN FRANCISCO, CALIFORNIA, A CORPORATION OF CALIFORNIA.

AIR SPRING.

Application filed April 8, 1921. Serial No. 459,603.

*To all whom it may concern:*

Be it known that we, VERLE V. VAN NATTAN and CARLTON R. GRAY, citizens of the United States, and residents of the city and county of San Francisco, State of California, have made a new and useful invention—to wit, Improvements in Air Springs; and we do hereby declare the following to be a full, clear, concise, and exact description of the same.

This invention relates particularly to a pneumatic cushioning device.

An object of this invention is to provide an improved air cushioning apparatus that is adapted to be interposed between relatively movable and immovable bodies.

A further object of the invention is to provide an air spring of this character that will be superior from a point of simplicity and inexpensiveness of construction, positiveness of operation, facility and convenience in use and general efficiency as contrasted with similar devices and mechanisms. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings,

Figure 1 represents a diagrammatic side elevation of a vehicle chassis showing spring members mounted thereon and devices constructed according to our invention interposed between said chassis and spring members.

Figure 2 represents a front elevation of Figure 1 showing the method of connecting the spaced air springs.

Figure 3 represents a front elevation of the method of connecting the rear air cushioning members.

Figure 4 is an enlarged side elevation of an air spring cushioning device constructed in accordance with our invention.

Figure 5 represents a vertical cross-sectional view through Figure 4 on the line 5—5.

Figure 6 represents a side elevation of a modified form of cushioning device constructed in accordance with our invention.

Figure 7 represents a partial sectional view taken through Figure 6 on the line 7—7.

Figure 8 represents a plan cross-section taken through Figure 4 on the line 8—8.

Figure 9 represents a plan cross-section taken through Figure 6 on the line 9—9.

Figure 10 represents an enlarged sectional view taken through the cylinder piston.

Figure 11 represents generally a cross-sectional view through an air valve mechanism mounted in the air cushioning device.

Figure 12 represents a perspective view of a slide yoke.

Pneumatic or fluid spring devices of a character similar to this invention, employ generally a fluid means for achieving a cushioning effect, but in so doing, necessitate quite complicated and ingenious constructions wherein internal compression pumps, pressure valves, telescoping cylinders, dash pots, universal joints and the like play an important part. The peculiar constructions of such similar cushioning devices require very accurate workmanship when applying the same in operative position to the frame of a vehicle. Where close and accurate alignment of parts is necessary in installation, it will be obvious that a very slight disarrangement will reduce the operating efficiency. In this invention, the cushioning effect is pneumatic and the construction of the unit such that a calibrated accuracy in installation is not required.

In detail the construction illustrated in the drawings comprises a chassis or frame of a vehicle generally designated by the numeral 1 and having the front leaf spring 2 secured to the front axle in any appropriate manner and an end thereof to the said frame by the shackle member 3 and the opposite end to the air spring member generally designated by the numeral 4, rigidly secured to the front end of said frame 1. The rear spring member 5 is likewise secured to the rear axle in an appropriate manner and has an end thereof pivotally mounted on the chassis or frame at 6 and the opposite end pivotally mounted in the air cushioning member, generally designated by the numeral 7, swivelly mounted on the rear end of the chassis or frame in a relatively stationary manner. It is to be understood that an air cushioning member 4 as shown in Figures 4 and 5, will be mounted on the front end of each side of the chassis and connected with each front spring 2. For the purpose of rigidly tying the members together, a cross-bar 8 extends therebetween and has the ends thereof rigidly secured to said members as shown in Figure 2. In a like manner, the ends of the chassis in the rear have cushioning members 7 pivotally mounted thereon and connecting with the leaf springs 5 in a universal manner, said members 7 being connected by a cross-rod 9 with the ends thereof rigidly secured to said members 7 as shown in Figure 3.

The air spring device 4 is designed primarily for the front portion of the chassis where the leaf spring joins thereto in a pivotal manner in contradistinction to a construction needing the interposition of a shackle member. Thus the type of air springs shown in Figures 4 and 5 can be used where a relatively movable member is adapted to be pivotally connected to a relatively immovable member whereas the construction shown in Figures 6 and 7 is utilized where a shackle member or other connecting medium is interposed between, relatively movable and immovable members to obtain a universal action.

The air cushioning device 4 consists of a cylindrical body portion open at an end thereof and exteriorly threaded adjacent thereto, as at 10, to permit an internally threaded cap member 11 being engaged therewith. The cap 11 is finished in any desirable and artistic external manner for the purpose of imparting esthetic qualities to an otherwise utilitarian device. The end of the cap 11 is bored and threaded concentrically to receive a valve member 12 having a spring ball check air valve 13 of any suitable type mounted therein and is enclosed by a dust cap 14 that is adapted to removably engage said member 12. Although I have shown and described the cylinder 4 as being open-ended and having an independent and separate cap member applied thereto, it would be clearly within the purview of this invention, to cast or otherwise solidly secure a member over the end of said cylinder and to provide an appropriate valve means either in the end of such integral portion or in any other part of the said cylinder. The cylinder 4 is provided with a raised portion 40 thereon to which a bracket 41 is adapted to be secured and in turn mounted on the chassis frame.

The construction thus far described refers to the closed cylinder 4 although it will apply equally as well to the cylinder 7 shown in Figures 6 and 7. Opposite the open end of said cylinders 4 and 7, the same is provided with a guide frame 15 as shown in Figures 4, 5, 6 and 7, integrally or otherwise formed thereon and preferably depending or extending therefrom. The guide frame 15 is provided with a lateral opening 16 therethrough in the form of a squared slideway and on either the front or rear face as the case may be—at right angles to said slideway 16—is provided with an opening 17 entering into said lateral slideway 16 for the purpose of passing the leaf spring members 2 and 5, respectively, to be hereinafter described in detail. The side of said guide frame 15 opposite the opening 17 is enclosed by a wall member 18 which may be in either a front or rear position according to the manner in which the assembled air spring device is placed on the chassis or frame and spring members.

A piston member 20 is provided with cup leathers 21 and 22, respectively, mounted on circular plates 23 and 24, rigidly secured to the reduced end 25 of a connecting rod 26 by the nut 27 or other equivalent fastening means. The piston 20 is adapted to reciprocate axially within the cylinders 4 or 7. The end of each cylinder is drilled concentrically as at 27 to provide a bearing opening through which the connecting rod 26 is adapted to pass. With particular reference to Figures 4 and 5, the connecting rod 26 consists of a cylindrical shaft having the end thereof drilled and internally threaded. The said shaft 26 is adapted to move concentrically relative to the cylinder 4 and with respect to the central axis of the lateral slideway 15. A U-shaped yoke member 28 is milled so as to slide freely within the slideway 16 and is provided with a central opening 29 through the base portion 30 thereof. The opening 29 is drilled so that the diameter thereof decreases midway between the ends as indicated at 31 in Figure 5 and said opening 29. It is also placed substantially concentric with the axis of the connecting rod 26 whereby the rounded end of said connecting rod may be placed into engagement with said opening and a threaded bolt 32 passed through the opening 29 and into engagement with the threaded end of the connecting rod, so that the rounded undersurface of the head portion 33 on said bolt would lie in contact with the base portion 30 and within the U-shaped arms of said yoke 28. An end 34 of the leaf spring is adapted to be passed between the spaced arms of the U-shaped yoke at 28, said yoke member 28 being drilled laterally at 35 and has a pin 36 passed therethrough and through the bearing portion 34 of said spring so as to hold the same in position. Thus the leaf spring is a relatively movable part and is secured to the yoke member 28 which in turn is secured to the connecting rod on the end of the piston 20, so that any movement of the leaf spring moves the piston accordingly to reciprocate it within the cylinder 4. It will be noted that the connection between the piston rod and yoke member permits of a slight oscillating action to compensate for any play or disalignments occurring between the piston and cylinder and the slide yoke. The pin 36 passing through the yoke member and leaf spring bearing might be termed a "floating" pin and is prevented from lateral disalignment by the shield 42 covering the transverse slideway 16 and secured to the guide frame 15 by suitable machine screws 45'. Thus all operative parts of the device may be quickly adjusted or assembled by easily removing the protective plate 42.

The spring member shown in Figures 6 and 7 embodies a slightly different construction than that previously described, in that the cylinder 7 is provided with a transverse bore therein through which the cross-rod 9 is adapted to pass. The cylinder is thus maintained in a pivotal relation with respect to said rod, and for mounting said cylinder 7 on the chassis, a forked member 45 is provided that partially surrounds said cylinder and permits the shaft 9 to pass through the spaced ends 46 and 47 thereof. The member 45 is rigidly secured to the chassis frame by rivets or welding or in any other suitable manner. In passing the rod 9 through the base of the cylinder 7, it is necessary to provide the connecting or piston rod 26 with an elongated slot 27 therethrough that will permit said connecting rod and slide 28 to move relatively thereto. As previously described, the end 49 of each spring 5 passes around a pin 36 mounted in the slide yoke 28. The cylinder shown in Figures 6 and 7 and the incidental mechanism relating thereto operates in a slightly different manner from that shown in Figures 4 and 5, for in the former the end of the chassis is provided with a yoke 45 that holds the cylinder 7 relatively stationary thereto in a pivotal manner. The piston element 20 reciprocates within the cylinder 7 and through movement of the interconnected rod, yoke member and leaf spring, functioning in the same manner as a standard spring shackle and permitting the device to be substituted in its place.

The invention operates in the following manner:

Air is passed through the valve 13 into the cylinders 4 or 7 until a predetermined pressure is obtained. It is desirable that the normal pressure keep the piston plunger 20 adjacent the closed end of the cylinder and thus permit movement in either direction. A small quantity of lubricant is placed within the cylinder on the upper end of the piston for obvious reasons and incidentally to effect a hermetic seal between the pressure contained within the cylinder and the atmosphere as thus pressure losses are reduced to a minimum. It will be obvious that any movement of the leaf spring element connected to the yoke members 28 in a vertical direction will impart a similar axial movement to the connecting rod and piston against the pressure head contained in the cylinder to thus effectively check any recoil. To counteract any vacuum that might occur betwen the underside of the piston 20 and the closed end of the cylinder, I have provided a by-pass 50 in the connecting rod 26 whereby when the piston moves away from the closed end of the cylinder, atmospheric air will be by-passed through the opening 50 in a limited quantity thereby permitting the piston to move freely without any retarding effects were the vacuum not to be compensated for. On the recoil, the air on the underside of the piston would be compressed before it could escape through the by-pass 50 and thus any movements of the piston can be effectively cushioned. In Figure 7, the slotted opening 27 in the connecting rod 26 functions in the same manner as the by-pass member 50 for relieving any suction effects within the interior of the cylinder 7.

Having thus described this invention, what we claim and desire to secure by Letters Patent is:

1. A cushioning device comprising a closed cylinder fixed to a vehicle frame and adapted to contain a pressure; a substantially closed guide frame including separate end guides depending from, and independent of said cylinder; a piston slidably retained within said cylinder; a block having its opposite ends slidably retained in said guides and connected to said piston and a movable vehicle spring connected to said block and adapted to move said interconnected block and piston axially with respect to said cylinder and guide way.

2. A cushioning device comprising a closed cylinder fixed to a vehicle frame and adapted to contain a pressure; a substantially closed guide frame depending from and independent of said cylinder; a piston slidably retained within said cylinder; a block having its opposite ends slidably guided in and movable axially in said guide frame with respect to said cylinder and loosely connected to said piston and a vehicle spring connected to said block and adapted to move the same.

3. A cushioning device comprising a closed cylinder fixed to a vehicle frame and adapted to contain a pressure; a substantially closed guide frame including separate end guides depending from and independent of said cylinder; a piston slidably retained within said cylinder; a connecting rod secured to said piston and extending from said cylinder axially within said guide frame; a block movable axially with respect to said cylinder in said guides and loosely connected to said rod and a vehicle spring connected to said block and adapted to move the same.

4. A cushioning device comprising a closed cylinder fixed to a vehicle frame and having a piston slidably retained therein and adapted to contain a relatively constant pressure between one side of said piston and an end of said cylinder; a guide frame, including separate end guides, secured to said cylinder; a cross-head slidably mounted in said guides, movable axially with respect to said cylinder and connected to said piston; a vehicle spring adapted to be connected to said cross-head intermediate its ends to move the same against said pressure; and means for confining a variable pressure between the opposite side of said piston and the opposite wall of said cylinder.

5. A cushioning device comprising a closed cylinder fixed to a vehicle frame and having a piston slidably retained therein and adapted to contain a relatively constant pressure between one side of said piston and an end of said cylinder; a connecting rod secured to said piston and extending from said cylinder; a guide frame including separate end guides secured to said cylinder; a cross-head slidably mounted in said guides, movable axially with respect to said cylinder and connected to said rod; a vehicle spring adapted to be connected to said cross-head, intermediate its ends, to move the same against said pressure; and means for confining a variable pressure between the opposite side of said piston and the opposite wall of said cylinder.

6. A cushioning device comprising a relatively stationary closed cylinder adapted to be fixed to a vehicle frame; a separate and substantially closed guide frame, including separate end guides, on said cylinder; a piston slidably retained in said cylinder and adapted to confine a relatively constant pressure between one side thereof and an end of said cylinder; means for retaining a variable pressure between the other side of said piston and the end of said cylinder; a cross-head slidably retained in said guides and connected with said piston and a relatively movable means of said vehicle secured to said cross-head.

7. A cushioning device comprising a relatively stationary closed cylinder adapted to be fixed to a vehicle frame; a separate and substantially closed guide frame, including separate end guides, on said cylinder; a piston slidably retained in said cylinder and adapted to confine a relatively constant pressure between one side thereof and an end of said cylinder; means for retaining a variable pressure between the other side of said piston and the end of said cylinder; a cross-head slidably retained in said guides and oscillatably connected with said piston and a relatively movable means of said vehicle secured to said cross-head.

8. An air-spring cushioning device such as described comprising a closed cylinder adapted to be pivotally mounted on a relatively stationary surface, a separate guide frame, including separate end guides, on said cylinder having an opening therein; a piston slidably retained in said cylinder and adapted to confine a relatively constant pressure between one side thereof and an end of said cylinder; means for confining a variable pressure between the other side of said piston and end of said cylinder; a cross-head slidably retained in said guides and connected with said piston and movable axially thereto and a relatively movable means extending through the opening in said guide frame and secured to said cross-head.

9. An air-spring cushioning device such as described comprising a closed cylinder adapted to be fixed to a vehicle frame; a separate guide frame, including separate end guides, on said cylinder having an opening therein; a piston slidably retained in said cylinder and adapted to confine a relatively constant pressure between one side thereof and an end of said cylinder; means for confining a variable pressure between the other side of said piston and end of said cylinder; a connecting rod on said piston and extending from said cylinder; a cross-head slidably retained in said guides and connected with said rod and movable relative thereto and a relatively movable vehicle spring means extending through the opening in said guide frame and secured to said cross-head.

10. A cushioning device comprising a relatively stationary closed cylinder adapted to be fixed to a vehicle frame; a separate and substantially closed guide frame, including separate end guides, depending from said cylinder; a piston and rod slidably guided in said cylinder, said piston being adapted to confine a substantially constant pressure between one face of it and the cylinder end, and a variable pressure between its opposite face and the opposite end of the said cylinder; a block slidably retained in said guides and loosely connected to said piston rod and a relatively movable vehicle spring means secured to and adapted to move said block.

11. An air spring cushioning device such as described comprising a closed cylinder adapted to be pivotally mounted on a relatively stationary element; a separate and substantially closed guide frame, including separate end guides, depending from said cylinder having an opening in the side thereof; a piston and rod slidably guided in said cylinder, said piston being adapted to confine a substantially constant pressure between one face of it and the cylinder end and a variable pressure between its opposite face and the opposite end of the said cylinder; a block slidably retained in said guides and loosely connected with said piston rod and movable axially therewith and a relatively movable vehicle spring extending through said opening in said guide frame and secured to said block.

12. An air-spring cushioning device such as described comprising a closed cylinder adapted to be fixed to a vehicle frame; a separate and substantially closed guide frame, including separate end guides, depending from said cylinder having an opening in the side thereof; a piston slidably retained in said cylinder, said piston being adapted to confine a substantially constant pressure between its opposite face and the opposite end of the said cylinder; a connecting rod on said piston extending from said cylinder axially within said guide frame; a block slidably retained in said guides and loosely connected with said rod and movable therewith and a relatively movable vehicle spring extending through the opening in said guide frame and secured to said block.

13. A cushioning device comprising a closed cylinder fixed on a vehicle frame and adapted to contain a presure; a separate and substantially closed guide frame including separate end guides depending from said cylinder having a slotted opening therein; a piston slidably retained in said cylinder, said piston being adapted to confine a substantially constant pressure between one face of it and the cylinder end and a variable pressure between its opposite face and the opposite end of the said cylinder; a cross-head slidably retained in said guides and loosely connected to said piston and a relatively movable vehicle spring means adapted to pass through said slotted opening in said guide frame, and be secured to said cross-head.

14. A cushioning device such as described comprising a closed cylinder; a substantially closed and independent guide frame, including separate end guides on said cylinder having an opening therein; a piston slidably retained in said cylinder, a connecting rod having an axial slot therein, said piston and rod extending from said cylinder axially within said guides; a block slidably retained in said guide frame and loosely connected to said rod and movable therewith; a movable vehicle spring adapted to extend through the opening in said guide frame and be secured to said block and means mounted on an end of said closed cylinder passing through said slotted rod adapted to be pivotally mounted on a relatively stationary vehicle frame.

15. An air-spring cushioning device such as described comprising a closed cylinder; a pin passing diametrically through a closed end of said cylinder adapted to have a relatively stationary element pivoted thereon; a substantially closed and independent guide frame including separate end guides depending from said cylinder and having an opening in the side thereof; a piston slidably retained in said cylinder; a connecting rod on said piston passing around said pin and extending from said cylinder within said guides and loosely connected to said piston rod and movable therewith and a movable spring extending through the opening in said frame and secured to said block.

16. A cushioning device comprising a closed cylinder fixed to a vehicle frame and adapted to contain a pressure; a substantially closed and independent guide frame, including separate end guides, adjacent said cylinder; a piston and rod slidably retained in said cylinder; a cross-head slidably retained in said guides and connected to said rod and a movable vehicle spring connected to said cross-head intermediate its ends and adapted to reciprocate said cross-head in said guide frame, to move said piston against said pressure.

17. A cushioning device comprising a closed cylinder fixed to a vehicle frame and adapted to contain a pressure; a substantially closed and independent guide frame including separate end guides having a side opening therein, mounted adjacent said cylinder; a piston and rod slidably retained in said cylinder; a cross-head slidably retained in said guides and connected to said rod; a movable vehicle spring passing through the opening in said guide frame and connected to said cross-head and adapted to reciprocate said cross-head in said guide frame, to move said piston against said pressure.

18. A cushioning device comprising a closed cylinder fixed to a vehicle frame and adapted to contain a pressure; a substantially closed and independent guide frame including separate end guides, having a side opening therein, mounted adjacent said cylinder; a piston and rod slidably retained in said cylinder; a cross-head slidably retained in said guides and connected to said rod; a movable vehicle spring passing through the opening in said guide frame and connected to said cross-head and adapted to reciprocate said cross-head in said guide frame, to move said piston against said pressure; and means in the bottom of said guide frame for limiting the reciprocative movement of said cross-head in one direction.

19. A device such as described comprising a closed cylinder adapted to contain a pressure; an independent guide frame, including separate end guides, adjacent said cylinder, said frame being substantially closed and provided with a side opening therein; a piston slidably retained in said cylinder having a connecting rod thereon, said rod having an axial slot therein; a cross-head slidably retained in said guides and connected to an end of said rod and movable therewith; a movable spring adapted to pass through the opening in said guide frame and be secured to said cross-head to move the rod and piston against the said pressure and a transverse rod mounted in an end of said closed cylinder and passing through said slotted rod and adapted to be pivotally mounted on a relatively stationary element.

20. A device such as described comprising a closed cylinder adapted to contain a pressure; an independent guide frame, including separate end guides adjacent said cylinder, said frame being substantially closed and provided with a side opening therein; a piston slidably retained in said cylinder having a connecting rod thereon, said rod having an axial slot therein; a cross-head slidably retained in said guides and connected to an end of said rod and movable therewith; a movable spring adapted to pass through the opening in said guide frame and be secured to said cross-head to move the rod and piston against the said pressure and a transverse rod mounted in an end of said closed cylinder and passing through said slotted rod and adapted to be pivotally mounted on a relatively stationary element; and means in the bottom of said closed guide frame for limiting the sliding movement of said cross-head in one direction.

21. A cushioning device comprising a cylinder closed at both ends; a piston slidably retained within said cylinder; a connecting rod on said piston adapted to pass through an end wall of said cylinder; means for maintaining a relatively constant pressure within said cylinder between one side of said piston and an end of said cylinder; means for confining a variable pressure within said cylinder between the opposite side of said piston and opposite end wall of said cylinder; a guide frame having a guide way therein secured to said cylinder; a member slidably mounted in the guide way of said guide frame and having said connecting rod secured thereto; an element adapted to engage said member; and an independent connection adapted to be secured to said cylinder to permit movement of said piston within said cylinder.

In testimony whereof, we have hereunto set our hands at San Francisco, California, this 11th day of March, 1921.

VERLE V. VAN NATTAN.
CARLTON R. GRAY.

In presence of—
LINCOLN V. JOHNSON.